United States Patent
Takahashi et al.

(10) Patent No.: US 12,067,879 B2
(45) Date of Patent: Aug. 20, 2024

(54) STAGGERING ALARM DEVICE AND STAGGERING ALARM CONTROL METHOD

(71) Applicant: Isuzu Motors Limited, Tokyo (JP)

(72) Inventors: Naoki Takahashi, Fujisawa (JP); Yuka Kusakari, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 95 days.

(21) Appl. No.: 17/795,026

(22) PCT Filed: Jan. 27, 2021

(86) PCT No.: PCT/JP2021/002806
§ 371 (c)(1),
(2) Date: Jul. 25, 2022

(87) PCT Pub. No.: WO2021/153603
PCT Pub. Date: Aug. 5, 2021

(65) Prior Publication Data
US 2023/0083967 A1    Mar. 16, 2023

(30) Foreign Application Priority Data
Jan. 27, 2020 (JP) ................................ 2020-010792

(51) Int. Cl.
| | |
|---|---|
| *B60D 1/30* | (2006.01) |
| *B60T 8/24* | (2006.01) |
| *G07C 5/04* | (2006.01) |
| *G08G 1/16* | (2006.01) |

(52) U.S. Cl.
CPC ................. *G08G 1/16* (2013.01); *B60D 1/30* (2013.01); *B60D 1/305* (2013.01); *B60T 8/24* (2013.01); *G07C 5/04* (2013.01)

(58) Field of Classification Search
CPC .. G08G 1/16; B60D 1/30; B60D 1/305; B60T 8/24; B60G 17/015
See application file for complete search history.

(56) References Cited

U.S. PATENT DOCUMENTS

2021/0024076 A1* 1/2021 Chen ..................... B60Q 9/008
2022/0289223 A1 9/2022 Zhang

FOREIGN PATENT DOCUMENTS

| CN | 2014-115983 | 6/2014 |
|---|---|---|
| CN | 106218634 | 12/2016 |
| CN | 110588510 | 12/2019 |
| JP | 2003-262530 | 9/2003 |
| JP | 2014-115983 | 6/2014 |
| JP | 2016-085563 | 5/2016 |
| JP | 2017-167046 | 9/2017 |
| WO | WO 2013/175594 | 11/2013 |

* cited by examiner

Primary Examiner — Benyam Haile

(57) ABSTRACT

The present invention relates to a staggering alarm device and a staggering alarm control method that can realize more effective alarm output. The staggering alarm device comprises: a staggering traveling detection unit which detects the staggering traveling of a vehicle; a waiting time setting unit which sets a waiting time on the basis of the driving proficiency of the driver of the vehicle; and an alarm output control unit which outputs an alarm from an alarm output unit, when the waiting time has elapsed after the detection of the staggering traveling.

2 Claims, 3 Drawing Sheets

STAGGERING ALARM DEVICE AND STAGGERING ALARM CONTROL METHOD

TECHNICAL FIELD

The present disclosure relates to a sway warning apparatus and a sway warning control method.

BACKGROUND ART

There has been known an apparatus that gives a warning to a driver when vehicle sway traveling is detected (see, for example, Patent Literature 1).

CITATION LIST

Patent Literature

PTL 1
Japanese Patent Application Laid-Open No. 2014-115983

SUMMARY OF INVENTION

Technical Problem

The conventional apparatus has room for improvement in terms of effective warning output.

It is an object of the present disclosure to provide a sway warning apparatus and a sway warning control method each capable of achieving more effective warning output.

Solution to Problem

A sway warning apparatus according to an embodiment of the present disclosure includes: a sway traveling detection section that detects sway traveling of a vehicle; a waiting time setting section that sets a waiting time based on driving proficiency of a driver of the vehicle; and a warning output control section that causes a warning output section to output a warning when the waiting time has elapsed since detection of the sway traveling.

A sway warning control method according to an embodiment of the present disclosure includes: detecting, by an apparatus mounted on a vehicle, sway traveling of the vehicle; setting, by the apparatus mounted on the vehicle, a waiting time based on driving proficiency of a driver of the vehicle; and causing, by the apparatus mounted on the vehicle, a warning output section to output a warning when the waiting time has elapsed since detection of the sway traveling.

Advantageous Effects of Invention

According to the present disclosure, it is possible to achieve more effective warning output.

DESCRIPTION OF EMBODIMENTS

Hereinafter, an embodiment of the present disclosure will be described in detail with reference to the accompanying drawings.

Figure 1:
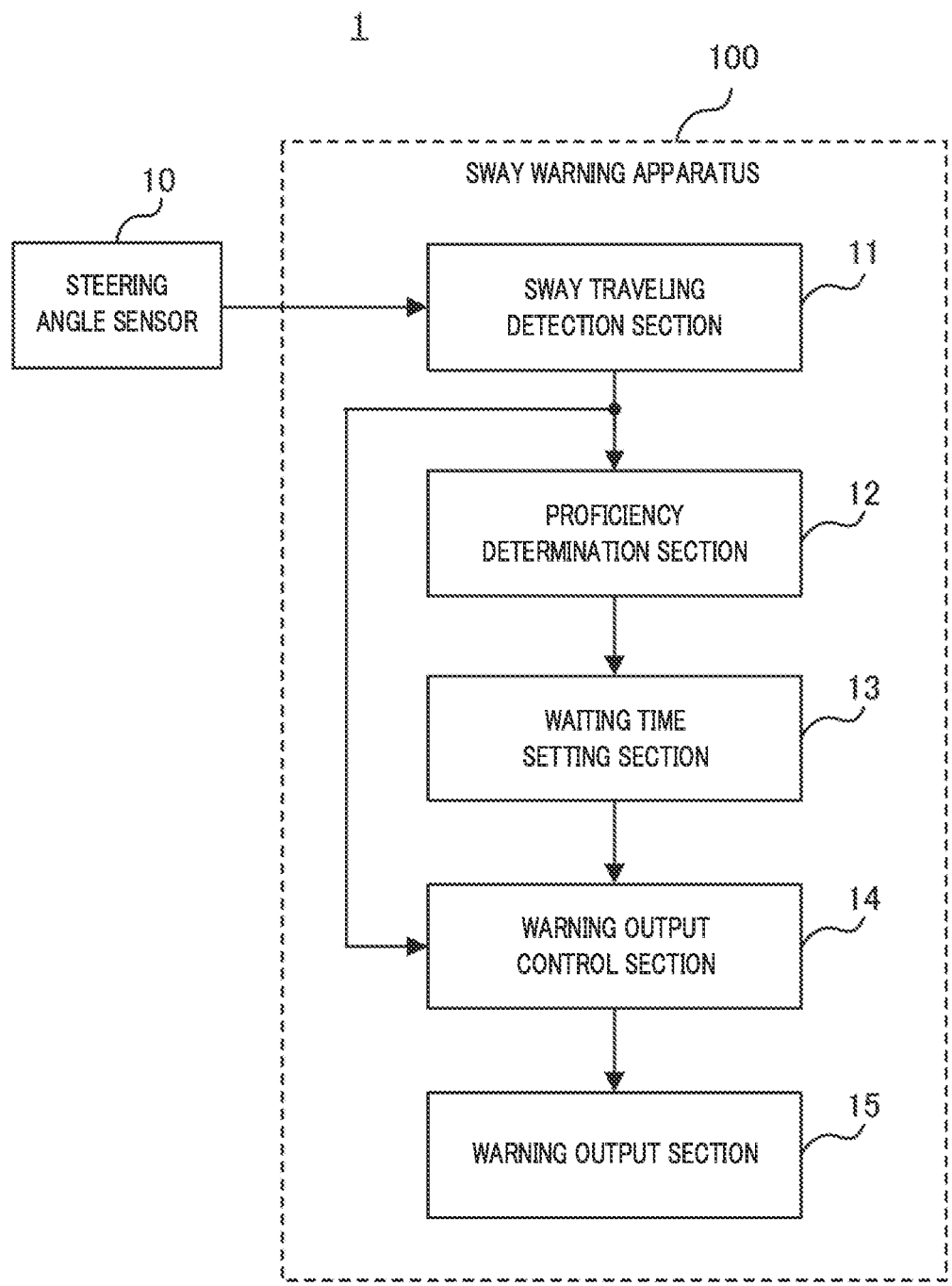
FIG. 1 is a block diagram illustrating configurations of a vehicle and a sway warning apparatus according to an embodiment of the present disclosure.

First, configurations of vehicle 1 and sway warning apparatus 100 according to an embodiment of the present disclosure will be described with reference to FIG. 1. FIG. 1 is a block diagram illustrating configurations of vehicle 1 and sway warning apparatus 100.

Vehicle 1 is, for example, an automobile, and may be a passenger car or a commercial vehicle.

As illustrated in FIG. 1, vehicle 1 includes steering angle sensor 10 and sway warning apparatus 100.

Steering angle sensor 10 is a device that detects a steering angle of a steering wheel (not illustrated). Steering angle sensor 10 outputs steering angle information indicating the detected steering angle to sway traveling detection section 11 of sway warning apparatus 100.

Sway warning apparatus 100 includes sway traveling detection section 11, proficiency determination section 12, waiting time setting section 13, warning output control section 14, and warning output section 15.

Although not illustrated, sway warning apparatus 100 includes, as hardware, a central processing unit (CPU), a read only memory (ROM) storing a computer program, and a random access memory (RAM), for example. The functions of sway warning apparatus 100 to be described below are implemented by running a computer program read from the ROM by the CPU.

Sway traveling detection section 11 detects sway traveling of vehicle 1 based on the steering angle information received from steering angle sensor 10. The processing for detecting sway traveling based on a steering angle is well-known, and thus the description thereof is omitted.

When detecting sway traveling of vehicle 1, sway traveling detection section 11 indicates the fact to proficiency determination section 12 and warning output control section 14. To be more specific, sway traveling detection section 11 outputs to proficiency determination section 12 and warning output control section 14 indication information indicating that sway traveling of vehicle 1 is detected.

Note that, in the present embodiment, sway traveling detection section 11 detects sway traveling based on a steering angle, by way of example, but the detection method is not limited to this. For example, sway traveling may be detected based on acceleration data of vehicle 1 in the right-left direction or another well-known parameter.

Proficiency determination section 12 determines driving proficiency (hereinafter, simply referred to as proficiency) of a driver of vehicle 1. A specific example of the determination processing will be described below.

First, proficiency determination section 12 counts, as the number of detections of sway traveling (hereinafter, referred to as the number of detections), how many times the indication information is received from sway traveling detection section 11 during a predetermined period of time (e.g., 1 to 2 hours) after vehicle 1 starts traveling. In the following, the period during which the number of detections is counted (for example, from the time vehicle 1 starts traveling until a predetermined time has elapsed) is referred to as a "count period".

Next, proficiency determination section 12 determines the proficiency by comparing the number of detections with a predetermined threshold. When the number of detections is equal to or greater than the threshold, for example, proficiency determination section 12 determines that the proficiency is low (hereinafter, referred to as low proficiency). Meanwhile, when the number of detections is less than the threshold, for example, proficiency determination section 12 determines that the proficiency is high (hereinafter, referred to as high proficiency).

Then, proficiency determination section 12 outputs proficiency information indicating the determined proficiency to waiting time setting section 13.

Waiting time setting section 13 sets a waiting time based on the proficiency information received from proficiency determination section 12.

The waiting time is a period of time from detection of sway traveling to warning output. In the present embodiment, three types of waiting times, which are a basic waiting time, a first waiting time, and a second waiting time, will be used for the description, by way of example.

The lengths of the basic waiting time, the first waiting time, and the second waiting time are determined in advance (for example, at the time of manufacture of sway warning apparatus 100). Note that the lengths of the basic waiting time, the first waiting time, and the second waiting time may be specified by a user.

The basic waiting time is approximately 15 minutes, for example. The first waiting time is shorter than the basic waiting time, and the second waiting time is longer than the basic waiting time.

Waiting time setting section 13 sets a waiting time to be used by warning output control section 14 (hereinafter, referred to as a waiting time for use) to the basic waiting time during the count period (in other words, when no proficiency determination is performed by proficiency determination section 12). Then, waiting time setting section 13 outputs waiting time information indicating the basic waiting time to warning output control section 14.

After the count period (in other words, when proficiency determination has been performed by proficiency determination section 12), waiting time setting section 13 sets the waiting time for use to either the first waiting time or the second waiting time based on the determined proficiency.

To be more specific, when the proficiency information indicates high proficiency, waiting time setting section 13 sets the waiting time for use to the first waiting time. Waiting time setting section 13 then outputs the waiting time information indicating the first waiting time to warning output control section 14.

When the proficiency information indicates low proficiency, in contrast, waiting time setting section 13 sets the waiting time for use to the second waiting time. Waiting time setting section 13 then outputs the waiting time information indicating the second waiting time to warning output control section 14.

When receiving the indication information from sway traveling detection section 11, warning output control section 14 gives a warning output instruction to warning output section 15 when the waiting time indicated in the waiting time information has elapsed since the reception of the indication information. Note that "the time of receiving indication information" in warning output control section 14 may mean the same as "the time of detecting sway traveling" in sway traveling detection section 11.

When the warning output instruction is given from warning output control section 14, warning output section 15 outputs a warning.

The warning may be, for example, an alarm sound from speakers on the right and left doors, or an image on a display provided on an instrument panel of a driver's seat. By outputting the warning in this manner, an occupant in vehicle 1 can recognize that vehicle 1 is swaying.

The configurations of vehicle 1 and sway warning apparatus 100 have been described, thus far.

An operation of sway warning apparatus 100 will be described below.

Figure 2:
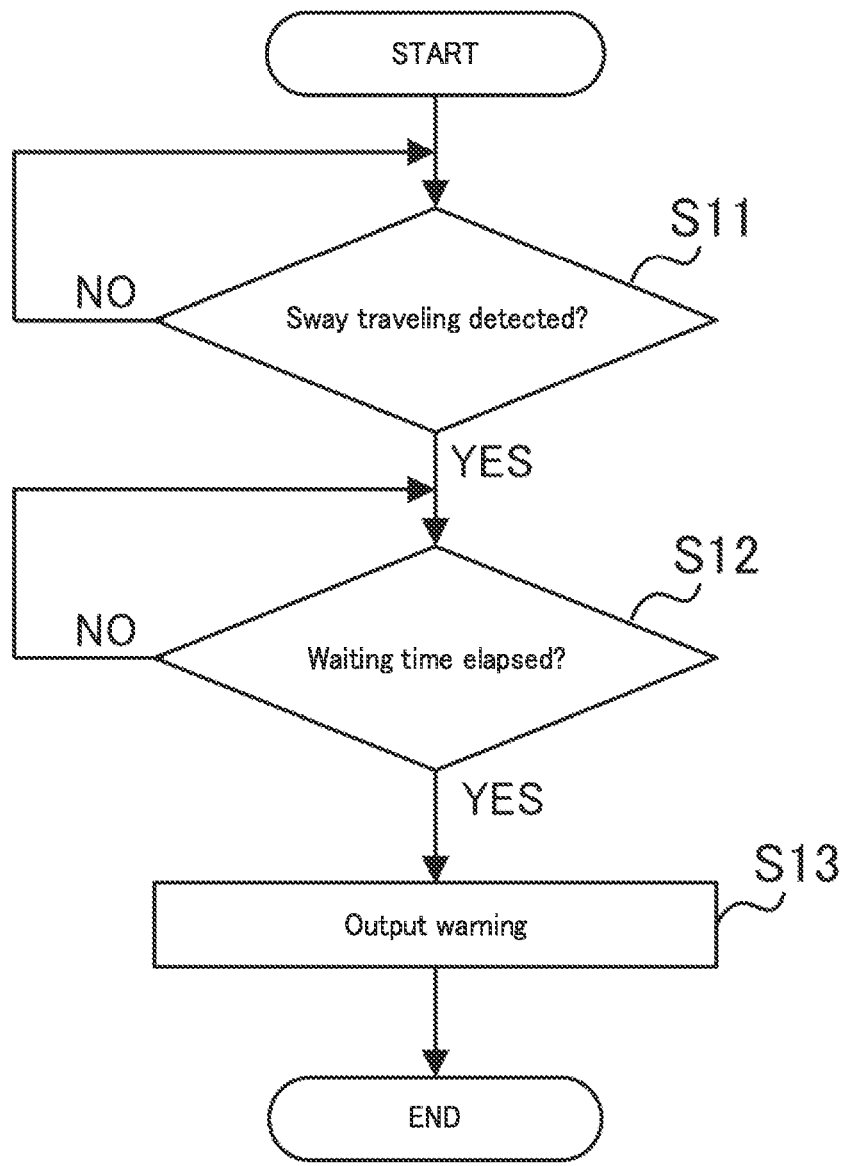
FIG. 2 is a flowchart describing a procedure of a warning output operation according to an embodiment of the present disclosure.

First, a warning output operation performed by sway warning apparatus 100 will be described with reference to FIG. 2. FIG. 2 is a flowchart describing a procedure of the warning output operation. The procedure described in FIG. 2 is initiated when vehicle 1 starts traveling, for example. Additionally, the procedure described in FIG. 2 is applicable during a count period as well as after a count period.

In step S11, sway traveling detection section 11 detects sway traveling of vehicle 1 based on the steering angle information from steering angle sensor 10.

When no sway traveling of vehicle 1 is detected (step S11: NO), the procedure returns to step S11.

When sway traveling of vehicle 1 is detected (step S11: YES), in contrast, the procedure proceeds to step S12. In this case, sway traveling detection section 11 outputs the indication information to warning output control section 14.

In step S12, upon receiving the indication information from sway traveling detection section 11, warning output control section 14 determines whether a waiting time has elapsed since that time (step S12). The waiting time here is the time indicated in the waiting time information received from waiting time setting section 13, and is any one of the basic waiting time, the first waiting time, and the second waiting time.

When the waiting time has not elapsed (step S12: NO), the procedure returns to step S12.

When the waiting time has elapsed (step S12: YES), in contrast, the procedure proceeds to step S13.

In step S13, warning output control section 14 instructs warning output section 15 to output a warning. This causes warning output section 15 to output a warning.

The warning output operation has been described, thus far.

Figure 3:
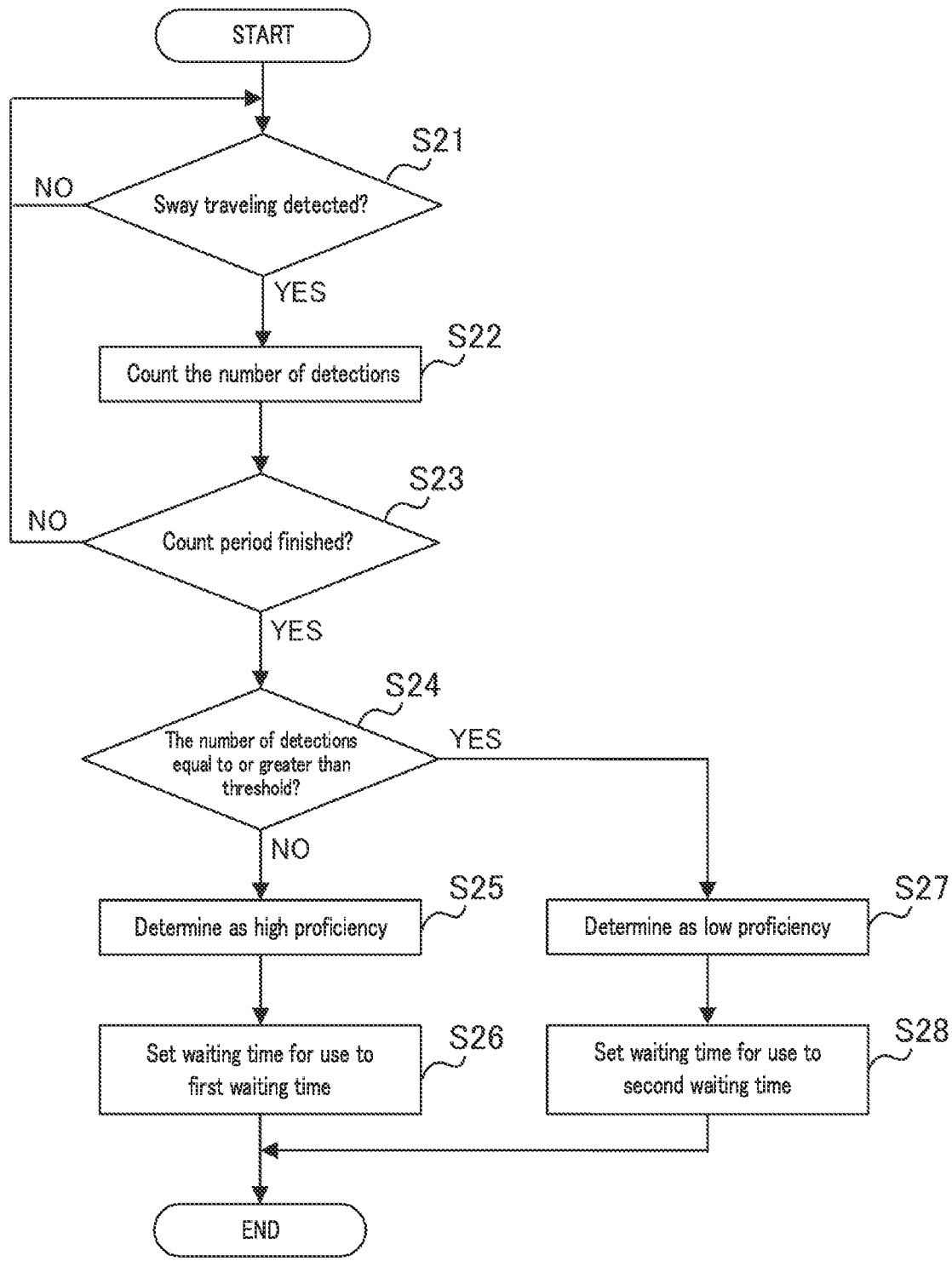
FIG. 3 is a flowchart describing procedures of a proficiency determination operation and a waiting time setting operation according to an embodiment of the present disclosure.

Next, a proficiency determination operation and a waiting time setting operation performed by sway warning apparatus 100 will be described with reference to FIG. 3. FIG. 3 is a flowchart describing procedures of the proficiency determination operation and the waiting time setting operation. The procedure described in FIG. 3 is initiated when vehicle 1 starts traveling, for example. Additionally, a count period starts when the procedure described in FIG. 3 starts, for example.

In step S21, sway traveling detection section 11 detects sway traveling of vehicle 1 based on the steering angle information from steering angle sensor 10.

When no sway traveling of vehicle 1 is detected (step S21: NO), the procedure returns to step S21.

When sway traveling of vehicle 1 is detected (step S21: YES), in contrast, the procedure proceeds to step S22. In this case, sway traveling detection section 11 outputs the indication information to proficiency determination section 12.

In step S22, proficiency determination section 12 counts the number of detections.

In step S23, proficiency determination section 12 determines whether the count period is finished.

When the count period is not finished (step S23: NO), the procedure returns to step S21.

When the count period is finished (step S23: YES), in contrast, the procedure proceeds to step S24.

In step S24, proficiency determination section 12 determines whether the number of detections is equal to or greater than a predetermined threshold.

When the number of detections is less than the predetermined threshold (step S24: NO), proficiency determination section 12 determines that the driver of vehicle 1 has high proficiency (step S25). Proficiency determination section 12 then outputs the proficiency information indicating high proficiency to waiting time setting section 13.

When the number of detections is equal to or greater than the predetermined threshold (step S24: YES), proficiency determination section 12 determines that the driver of vehicle 1 has low proficiency (step S27). Proficiency determination section 12 then outputs the proficiency information indicating low proficiency to waiting time setting section 13.

In step S26, waiting time setting section 13 sets the waiting time for use to the first waiting time based on the proficiency information indicating high proficiency. Waiting time setting section 13 then outputs the waiting time information indicating the first waiting time to warning output control section 14. This leads warning output control section 14 to determine whether the first waiting time has elapsed in step S12 of FIG. 2 described above.

In step S28, waiting time setting section 13 sets the waiting time for use to the second waiting time based on the proficiency information indicating low proficiency. Waiting time setting section 13 then outputs the waiting time information indicating the second waiting time to warning output control section 14. This leads warning output control section 14 to determine whether the second waiting time has elapsed in step S12 of FIG. 2 described above.

The proficiency determination operation and the waiting time setting operation have been described, thus far.

As described in detail above, sway warning apparatus 100 according to the present embodiment is characterized by setting the waiting time, which is a period of time from the detection of sway traveling to the warning output, based on the proficiency of a driver of vehicle 1.

In the case of high proficiency, the detected sway traveling is most likely to be caused by driver's abnormality (e.g., deterioration in health) or inattention (e.g., drowsy driving or distracted driving). Thus, setting the waiting time for use to the first waiting time, which is shorter than the basic waiting time, enables prompt warning output.

Meanwhile, in the case of low proficiency, the detected sway traveling is most likely to be caused by poor driving skills, and the driver is aware of this in most cases. Thus, setting the waiting time for use to the second waiting time, which is longer than the basic waiting time, makes the driver feel less annoyed at the warning output.

From the above operation, sway warning apparatus 100 according to the present embodiment achieves more effective warning output when sway traveling is detected.

Note that the present disclosure is not limited to the embodiment described above, and can be implemented with modifications as appropriate without departing from the spirit of the present disclosure.

In the embodiment described above, two levels of proficiency, which are high proficiency and low proficiency, are used for the description, by way of example, but three or more levels of proficiency may be used.

In that case, proficiency determination section 12 may determine that the greater the number of detections in the count period, the lower the proficiency. Additionally, waiting time setting section 13 may set a lower waiting time as the proficiency is higher (in other words, the lower the proficiency, the longer the waiting time).

The disclosure of Japanese Patent Application No. 2020-010792, filed on Jan. 27, 2020, including the specification, drawings and abstract, is incorporated herein by reference in its entirety.

INDUSTRIAL APPLICABILITY

A sway warning apparatus and a sway warning control method of the present disclosure are useful for warning output when vehicle sway traveling is detected.

REFERENCE SIGNS LIST

1 Vehicle
10 Steering angle sensor
11 Sway traveling detection section
12 Proficiency determination section
13 Waiting time setting section
14 Warning output control section
15 Warning output section
100 Sway warning apparatus

The invention claimed is:

1. A sway warning apparatus, comprising:
a sway traveling detection section that detects sway traveling of a vehicle;
a waiting time setting section that sets a waiting time to be shorter as driving proficiency of a driver of the vehicle is higher, the waiting time being a period of time from detection of the sway traveling to warning output; and
a warning output control section that causes a warning output section to output a warning when the waiting time has elapsed since detection of the sway traveling,
a proficiency determination section that determines the proficiency to be lower as a number of a plurality of the detections of the sway traveling is greater in a predetermined period.

2. A sway warning control method, comprising:
detecting, by an apparatus mounted on a vehicle, sway traveling of the vehicle;
setting, by the apparatus mounted on the vehicle, a waiting time to be shorter as driving proficiency of a driver of the vehicle is higher, the waiting time being a period of time from detection of the sway traveling to warning output; and
causing, by the apparatus mounted on the vehicle, a warning output section to output a warning when the waiting time has elapsed since detection of the sway traveling,
wherein the proficiency is determined to be lower as a number of a plurality of the detections of the sway traveling is greater in a predetermined period.

* * * * *